United States Patent [19]
Conrad

[11] Patent Number: 4,755,818
[45] Date of Patent: Jul. 5, 1988

[54] AIRCRAFT COLLISION WARNING SYSTEM

[75] Inventor: Raymond W. Conrad, Russellville, Ala.

[73] Assignee: The United States of America as represented by the Secretary of the Army, Washington, D.C.

[21] Appl. No.: 896,788

[22] Filed: Aug. 15, 1986

[51] Int. Cl.[4] .............................................. G08G 5/04
[52] U.S. Cl. .................................... 340/961; 340/963; 342/29; 342/54
[58] Field of Search ....................... 340/961, 963, 964; 364/461; 342/29, 54, 61, 65; 372/5, 101, 108, 109; 73/178 R, 178 T; 250/353; 350/416; 330/4.3; 332/7.51; 455/609; 356/73, 416, 4

[56] References Cited

U.S. PATENT DOCUMENTS

| | | | |
|---|---|---|---|
| 3,052,882 | 9/1962 | Pidhayny et al. | 340/961 |
| 3,345,633 | 10/1967 | Runge | 342/29 |
| 3,551,676 | 12/1970 | Runnels | 340/961 |
| 3,620,626 | 11/1971 | Daly et al. | 340/961 |
| 3,670,258 | 6/1972 | Magnante | 372/101 |
| 3,761,184 | 9/1973 | McLaughlin, Jr. | 356/416 |
| 3,846,746 | 11/1974 | Trageser et al. | 340/961 |
| 3,970,391 | 7/1976 | Johnson et al. | 356/152 |
| 4,037,959 | 7/1977 | Bumgardner | 356/141 |
| 4,203,667 | 5/1980 | Pierce et al. | 455/609 |
| 4,277,170 | 7/1981 | Miles | 340/961 |
| 4,468,778 | 8/1984 | Karning et al. | 372/108 |
| 4,638,508 | 1/1987 | Hintz et al. | 455/609 |
| 4,662,726 | 5/1987 | Rines et al. | 350/444 |
| 4,664,518 | 5/1987 | Pfund | 455/609 |

*Primary Examiner*—Donnie L. Crosland
*Assistant Examiner*—Brent A. Swarthout
*Attorney, Agent, or Firm*—Freddie M. Bush; James T. Deaton

[57] ABSTRACT

An aircraft collision warning system in which a low power pulsed laser system projects narrow bandwidth radiation into $4\pi$ steradians around an aircraft and a matched, narrow bandwidth receiver system, with a $4\pi$ steradian field-of-view which detects such radiation emitted from another aircraft within range of the receiver and activates appropriate warning.

10 Claims, 3 Drawing Sheets

000
AIRCRAFT COLLISION WARNING SYSTEM

DEDICATORY CLAUSE

The invention described herein may be manufactured, used, and licensed by or for the Government for governmental purposes without the payment to me of any royalties thereon.

BACKGROUND OF THE INVENTION

In the past, aircraft have not had sufficient warning systems to warn them of another approaching aircraft that may be on a collision course therewith. Therefore, it can be seen that a system which provides a warning, either audible, visual or both, when one aircraft penetrates the "bubble" of radius R surrounding another aircraft is needed.

Accordingly, it is an object of this invention to provide an aircraft collision warning system utilizing laser technology.

Another object of this invention is to provide an aircraft collision warning system that is sufficiently low in cost to be affordable by the entire general aviation community.

Still another object of this invention is to provide an aircraft visual warning system which is safe for all.

A still further object of this invention is to provide a collision warning system in which warning is provided either audibly, visually, or both when one aircraft penetrates the "bubble" of a predetermined radius about another aircraft.

Other objects and advantages of this invention will be obvious to those skilled in this art.

SUMMARY OF THE INVENTION

In accordance with this invention, an aircraft collision warning system is provided in which each aircraft broadcast a laser beam in all directions using a small pulsed laser source and each aircraft also has a receiver which receives only radiation at the laser wavelength desired and when the receiver receives an appropriate signal from another aircraft in a predetermined radius thereof a warning system is activated to warn the operator to conduct a visual search and "see and avoid" the other aircraft.

DESCRIPTION OF THE PREFERRED EMBODIMENT

Figure 1:
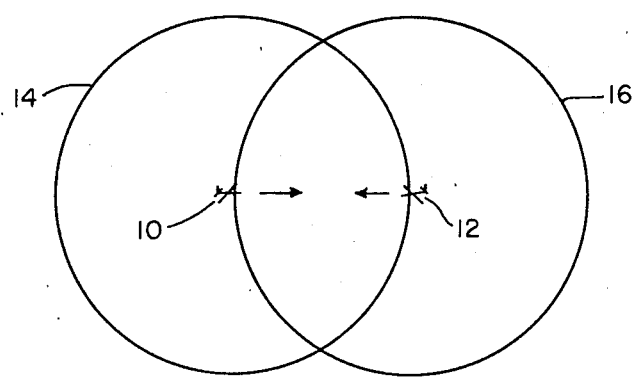
FIG. 1 is a schematic illustration of simultaneous bubble penetration by two approaching aircrafts.

Referring now to the drawings wherein like or equivlent parts are designed by like reference numbers, a collision warning system in accordance with this invention in its application is illustrated in FIG. 1 and includes aircraft 10 and 12 that are each protected by their specific spherical bubble 14 or 16 therearound. Each bubble of protection 14 or 16 represents the radiation emitted from each respective aircraft and the radius at which the corresponding energy from another aircraft can be received. When two aircraft penetrate each others bubble, the radiation from the opposite aircraft is picked up and detected to warn that another aircraft is in visible range and a visual search for "see and avoid" should be made to ensure avoiding the other aircraft.

Figure 2:
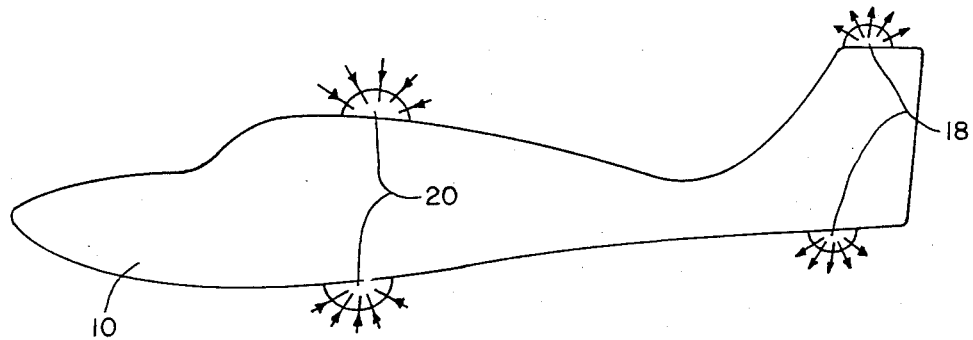
FIG. 2 illustrates an aircraft with transmitters and receivers for transmitting and receiving laser energy over 4 $\pi$ steradian, FIG. 3 schematically illustrates a transmitter receiver arrangement for the system of this invention.
Figure 3:
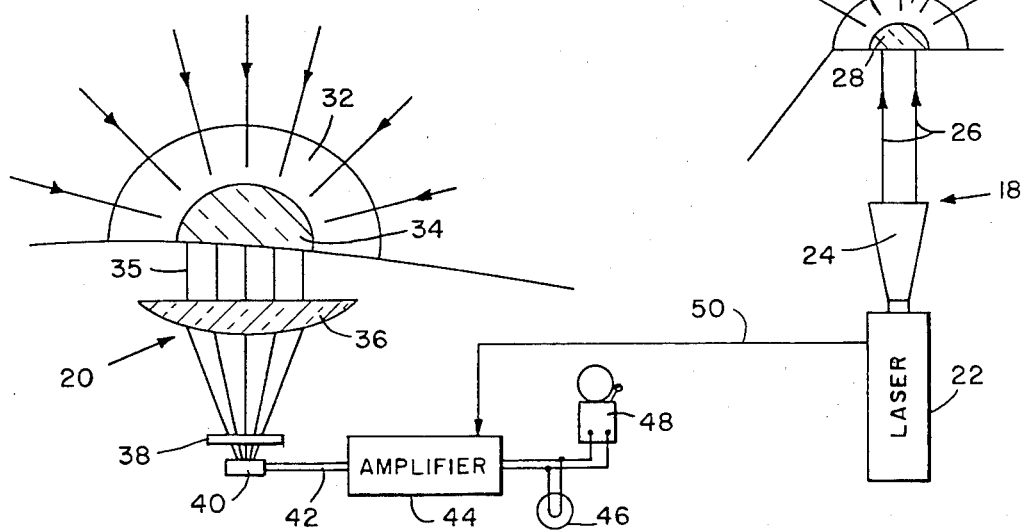

Each aircraft is provided with a 360° bubble transmitter including a pair of transmitters 18 and each aircraft is also provided with a pair of receivers 20 that are designed to receive radiation from 360°. A transmitter and receiver system is illustrated in FIG. 3 and includes a Q-switched laser 22 that has a beam expander section 24 for directing rays 26 to fish-eye lens 28 and through plastic dome 30 to the atmosphere for radiating toward any other aircraft. Each receiver 20 includes a plastic dome 32 through which laser radiation from another aircraft is received and transmitted by fish-eye lens 34 as rays 35 to focusing lens 36 which focuses the energy onto detector 40. A narrow-band filter 38 is provided for filtering out undesirable radiation. The output from detector 40 is connected through leads 42, amplifier 44 and from amplifier 44 to a light warning device 46 and an audible warning device 48. The output from the receiver is controlled by an input through connection 50 to amplifier 44 which is utilized to switch the receiver off as laser 22 is Q-switched so that the detector is in the off position when transmitter 18 is transmitting pulse energy. The system illustrated utilizes a pair of detectors and transmitters on each aircraft as illustrated in FIG. 2 and each laser 22 is caused to transmit simultaneously so that the receivers are off when transmitters are on. Laser 22 need only operate at a few Hertz, at a convenient non-visible wavelength, eg 1 micrometer. Thus a neodyminum laser can be used. A laser operating at 1.3 micrometers or more, eg erbium, has the advantage of enhanced safety.

Figure 4:
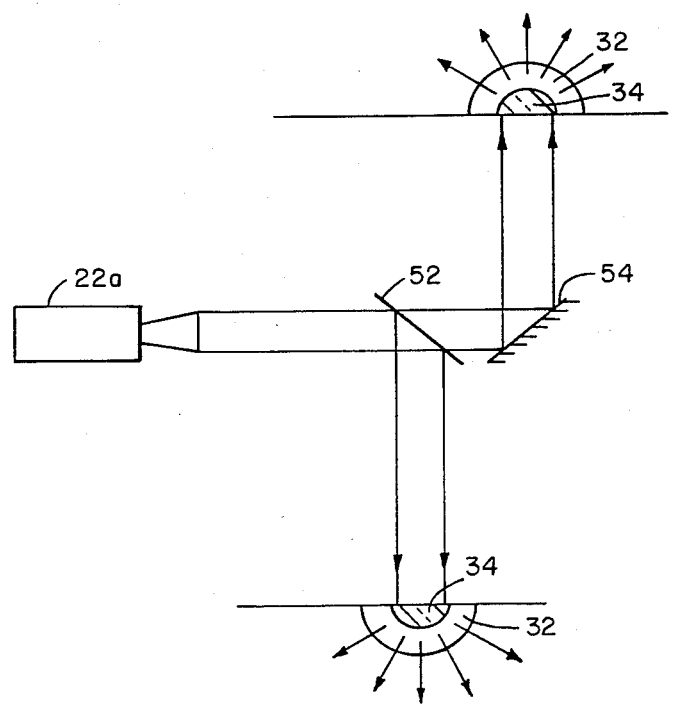
FIGS. 4 and 5 illustrate transmitting optics systems in which a single laser can be used.
Figure 5:
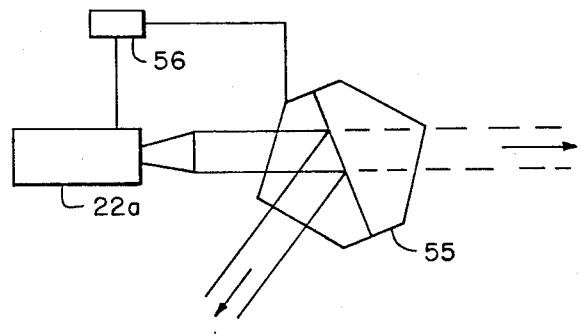

In some applications, it may be desired to use a single laser transmitter that transmits at twice the normal pulse energy of the laser used with a single transmitter, and if this is the case, a laser 22A (See FIG. 4) can be utilized with a beam-splitter 52 and a turning mirror 54 to direct the energy in opposite directions as illustrated. Also, a frustrated total internal reflectance switch as illustrated in FIG. 5 at 55 can be utilized to cause the energy to be directed in different directions.

Figure 6:
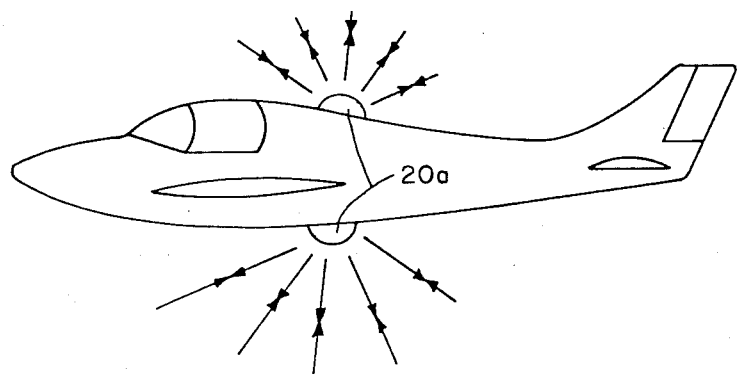
FIG. 6 illustrates an aircraft with two combined transmitters and receivers, each of which covers 2 $\pi$ steradians.
Figure 7:
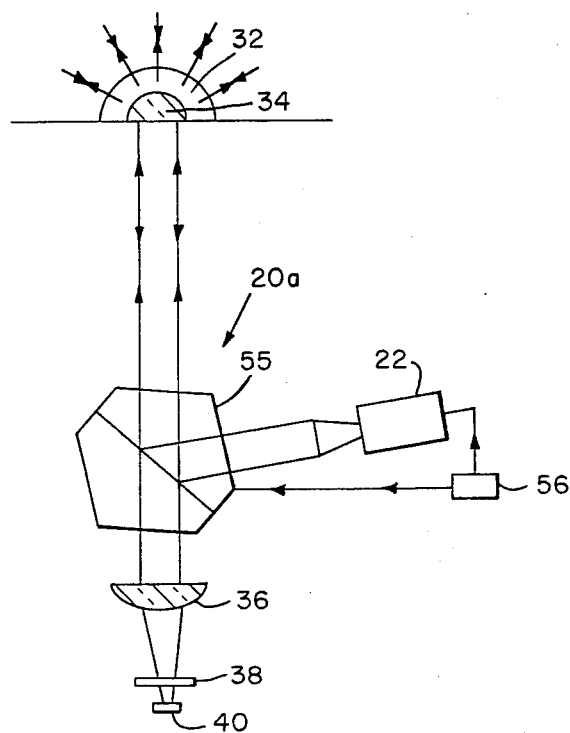
FIGS. 7 and 8 illustrate transmitter and receiver arrangements for laser energy, and FIG. 9 schematically illustrates a transmitter receiver arrangement that can be utilized for transmitting and receiving laser radiation.
Figure 8:
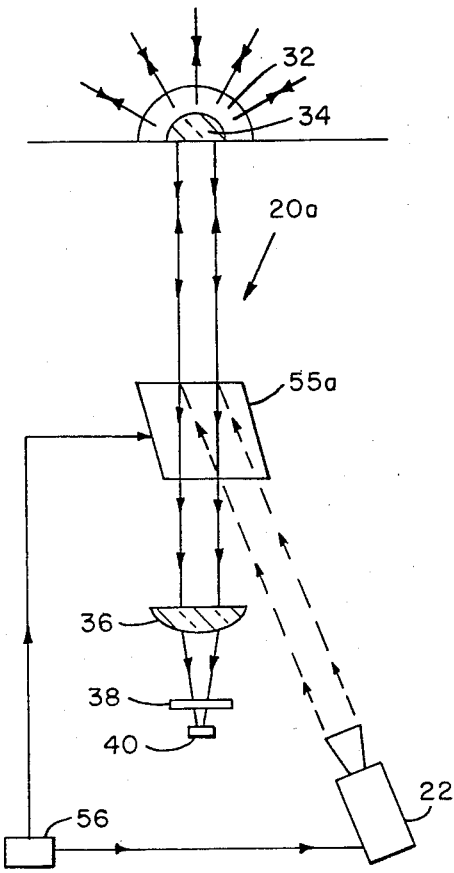
Figure 9:
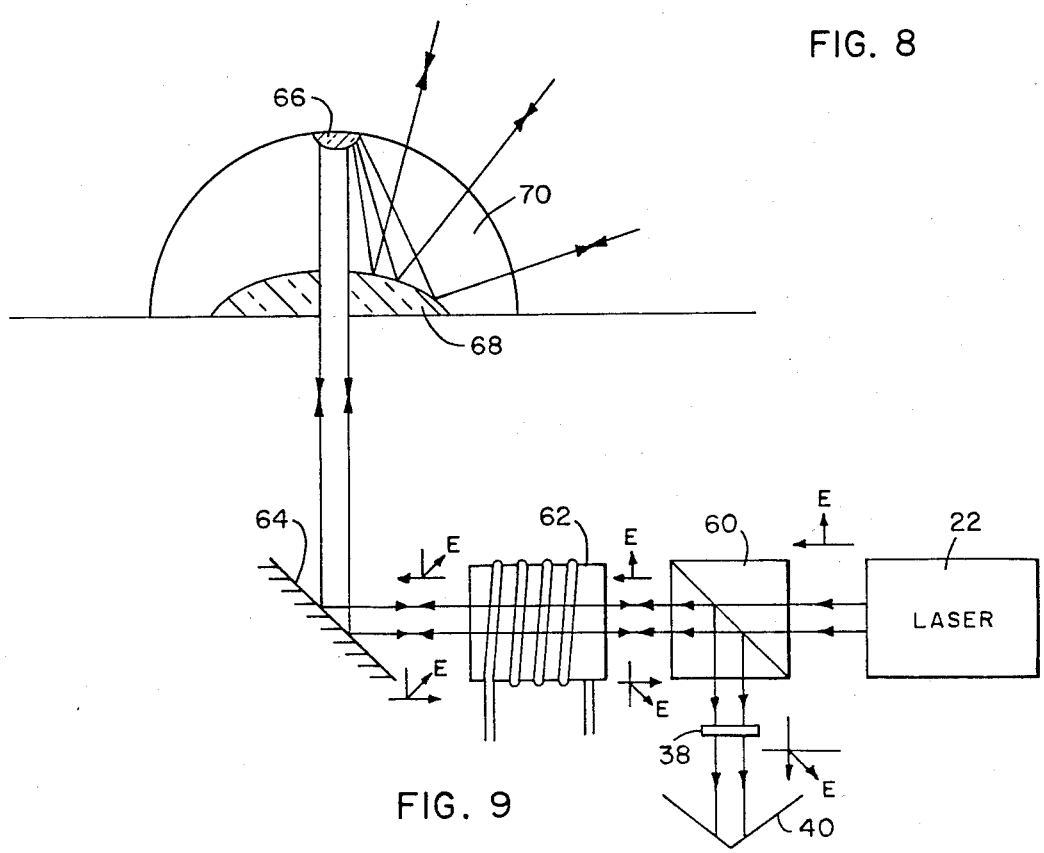

Referring now to FIG. 6, instead of having two transmitters and two receivers as illustrated in FIG. 2, 2 $\pi$ steradian transceivers 20A can be located for complete spherical coverage as illustrated in FIG. 6. These transceivers 20A can take the configuration as illustrated in FIGS. 7, 8 and 9. As illustrated in FIG. 7, transceiver 20A includes a laser 22 which focuses energy onto frustrated total internal reflectance switch 55 which reflects the energy when properly controlled by trigger 56 to cause energy to be reflected through fish-eye lens 34 and plastic dome 32. Trigger 56 is provided for causing laser 22 to be alternately on and to switch frustrated total internal reflectance switch 55 for receiving energy from another aircraft back through plastic dome 32, fish-eye lens 34, switch 55, to focusing lens 36, filter 38 and finally to detector 40. The signal produced by detector 40 is processed in the same manner as illustrated for light 46 and audio 48 of FIG. 3. The embodiment of FIG. 8 operates in the same manner as that described for FIG. 7 except an acoustic optic modulator 55a has been substituted for frustrated total internal reflectance switch 55.

Another arrangement for a transmitter receiver is illustrated in FIG. 9 and includes a laser 22 which operates at eg 1.06 micrometers and is Q-switched and gates detector 40 off when laser 22 is switched on. Laser 22 produces pulses of about 20 nanoseconds and which are transmitted through polarizing prism 60. The laser beam is initially polarized in eg the vertical plane as illustrated. This polarization is transmitted through the prism unattenuated. The laser beam then passes through a Faraday rotator 62 which rotates the axis of polarization by 45°. The resultant 45° polarized beam as illustrated is reflected by mirror 64 and transmitted through a wide field-of-view telescope or a fish-eye lens as illustrated, which has a $2\pi$ steradian field-of-view. The fish-eye lens includes lens 66 that the laser energy is first reflected from and onto lens 68 and outward therefrom through plastic dome 70. The pulse repetition rate of laser 22 need only be one or a few Hertz. This portion of the system then functions as the beacon. Although 1.06 micrometer radiation in this laser 22 is used as an example, other wavelengths are preferable. That is, for increased safety on the ground, a laser operating at 1.3 or higher micrometers, i.e., an "eye-safe" wavelength is most desirable.

The receiver portion of the system uses the same receiving optics 64, 66 and 68 as the transmitter. Since the Faraday rotator 62 is a non-reciprocal device, polarization of the return beam is 90° relative to the output beam. The return beam is therefore reflected as illustrated into detector 40. For additional rejection, the detector is gated off as laser 22 is transmitting during the pulse of the laser. Thus, if all transceivers conform to this polarization convention, all receivers can "see" all other beacons except their own. With the beacon system operating at one micrometer, detector 40 can be a silicon diode, either PiN or avalanche. It is to be understood that detector 40 is to be connected to visual and acoustic detectors as illustrated in FIG. 3 for providing appropriate warning.

The warning system of this invention has an effective range of more than a kilometer, using a laser with a Q-switch pulse energy of about a joule. The radiation pattern can be adjusted to increase the range in the forward direction if desired. Even with 1 km range in the forward direction, 5.5 seconds of warning time is given to both of two aircraft approaching head-on at a closure rate of 360 mph. This is a rather stressing case, but even so, more than 5 seconds is adequate to perform a visual search and take evasive action. With a forward-enhanced radiation pattern, the warning time can be increased to 7-8 seconds. Since practically all mid-air collisions and near-collisions occur in Visual Flight Regulations conditions and at relatively low altitudes, aircraft speeds are limited to 200-250 kts, depending on the type of aircraft. Most single engine and many light twins are not capable of cruising at even these speeds. Thus, a 360 mph closure rate is a reasonable assumption. As will be appreciated, this invention provides the necessary warning in any atmospheric conditions, day or night, for which attenuation is not severe. If attenuation is severe, this means the visibility is very poor and that Instrument Flight Regulation is in force and that separation is therefore being provided by Air Traffic Control.

If desired, a gear-up switch can be used in the system which limits the system to airborne operation only. This is a feature that can be used to insure that undesirable laser energy is not transmitted when the plane is on or near ground level.

In operation, each aircraft should have a warning system of the type set forth herein; however, some aircraft may only have a receiver or a transmitter and this alone will provide a measure of protection for the aircraft. To carry out the full intention of this invention, each aircraft broadcasts a laser beam in all directions using the small pulse laser source. Each aircraft also has a receiver which receives only radiation at the transmitted laser wavelength from another aircraft. When any aircraft receives a signal, this means that another aircraft is within the receiving range of its system, i.e., an aircraft has penetrated its protective bubble. Also, the penetrating aircraft is also warned because its bubble has also been penetrated. Now both aircraft operators are warned to conduct a visual search and "see and avoid." In this way, each aircraft is warned of an approaching aircraft that may be on a collision course. Accordingly, each aircraft avoids the other by the operators of the two aircraft making visual searches after having been warned by the warning system. Almost all near-collisions occur in visual flight regulation conditions, and observation and avoidance in accordance with this invention is highly successful.

I claim:

1. An aircraft collision warning system comprising an aircraft having a low power pulse laser system which projects narrow bandwidth radiation through transmitter fish-eye lens means and around the aircraft in $4\pi$ steradians of two hemispheres, said laser system including an eye-safe laser means with beam expander means for directing rays to said transmitter fish-eye lens means and into the area around the aircraft, and a matched, narrow bandwidth receiver system mounted on said aircraft with a 360° field-of-view which detects radiation emitted from another aircraft within range of said receiver system through receiver fish-eye lens means adapted for receiving emitted radiation from another aircraft in $4\pi$ steradians of two hemispheres, said receiver system including focusing lens means for directing received radiation onto a detector means, filter means disposed between said focusing lens means and detector means for filtering out undesirable radiation, amplifier means for amplifying an output from said detector means, and warning means responsive to said output from said detector means for activating a warning when radiation emitted from another aircraft within range of said receiver system is detectd by said detector means.

2. An aircraft collision warning system as set forth in claim 1, wherein said transmitter fish-eye lens means includes a pair of transmitter fish-eye lens with one of said transmitter fish-eye lens being on an upper side of said aircraft and the other of said pair of transmitter fish-eye lens being on a lower side of said aircraft, and said receiver fish-eye lens means includes a pair of receiver fish-eye lens, one of said pair of receiver fish-eye lens being located at an upper surface of said aircraft and the other of said pair of receiver fish-eye lens being located on a lower surface of said aircraft, whereby said pair of transmitter fish-eye lens are located for transmitting energy therefrom in 360° and wherein said pair of receiver fish-eye lens are located for receiving energy from another aircraft in 360°.

3. An aircraft collision warning system as set forth in claim 1, wherein said laser system and said receiver system have a common transmitter and receiver fish-eye lens means located at an upper surface of said aircraft and another common transmitter and receiver fish-eye lens means located at a lower surface of said aircraft.

4. An aircraft collision warning system as set forth in claim 1, wherein said eye-safe laser means is a single laser with divider means for transmitting energy to said transmitter fish-eye lens means for radiation from said aircraft.

5. An aircraft collision warning system as set forth in claim 1, wherein said warning means includes both visual and audible warning signal means.

6. An aircraft collision warning system as set forth in claim 1, wherein said warning means includes a visual indicator.

7. An aircraft collision warning system as set forth in claim 1, wherein said eye-safe laser means operates at 1.3 micrometers.

8. An aircraft collision warning system as set forth in claim 1, wherein said warning means includes an audible warning system means.

9. An aircraft collision warning system as set forth in claim 2, wherein said warning means includes both visual and audible warning signal means.

10. An aircraft collision warning system as set forth in claim 9, wherein said eye-safe laser means operates at 1.3 micrometers.

* * * * *